Figure 1:
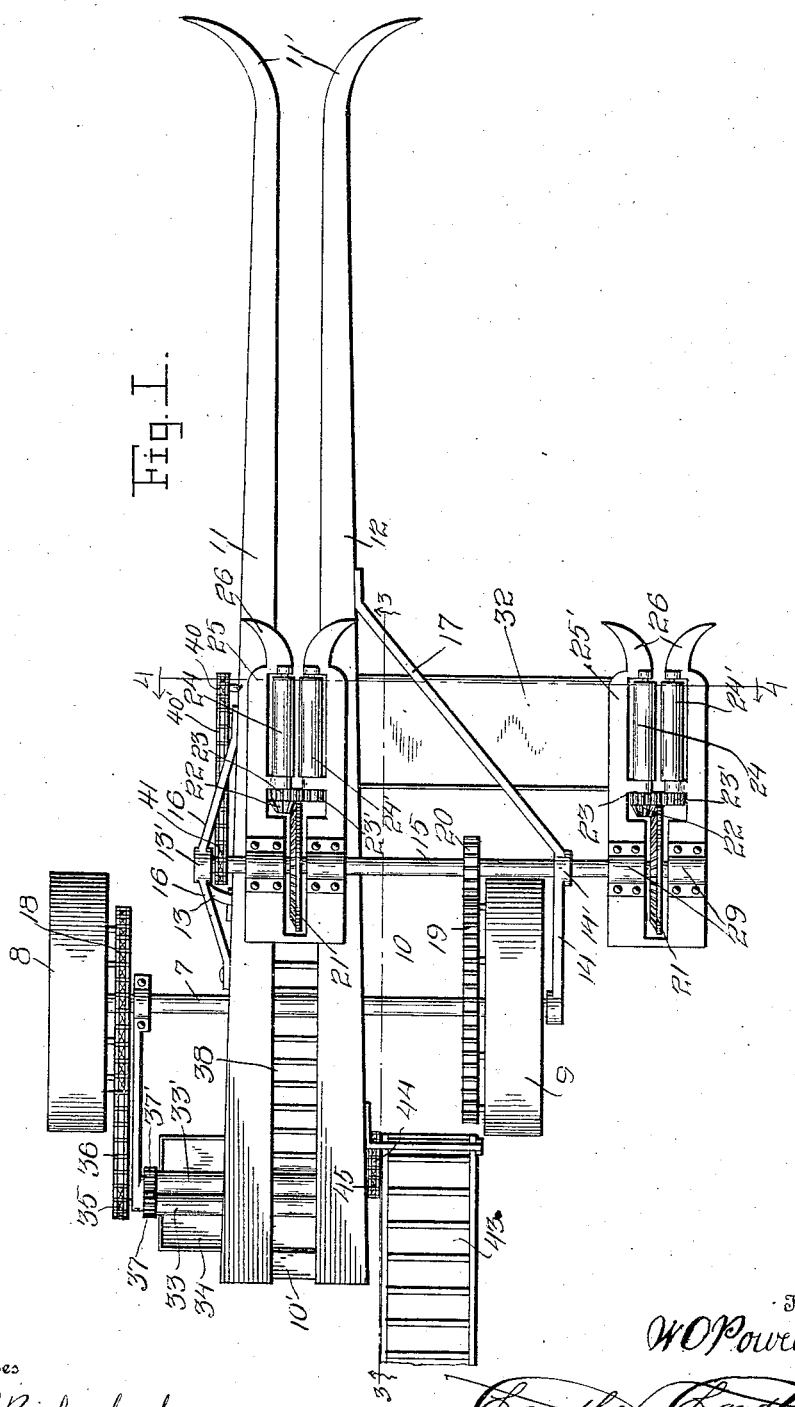

No. 880,467. PATENTED FEB. 25, 1908.
W. O. POWELL.
CORN HARVESTING AND HUSKING MACHINE.
APPLICATION FILED OCT. 30, 1906.

3 SHEETS—SHEET 1.

Witnesses
Inventor
W O Powell
By
Attorneys

No. 880,467. PATENTED FEB. 25, 1908.
W. O. POWELL.
CORN HARVESTING AND HUSKING MACHINE.
APPLICATION FILED OCT. 30, 1906.
3 SHEETS—SHEET 2.

Witnesses
C. K. Reichenbach
F. C. McCartney

Inventor
W. O. Powell
By Chandler & Chandler
Attorneys.

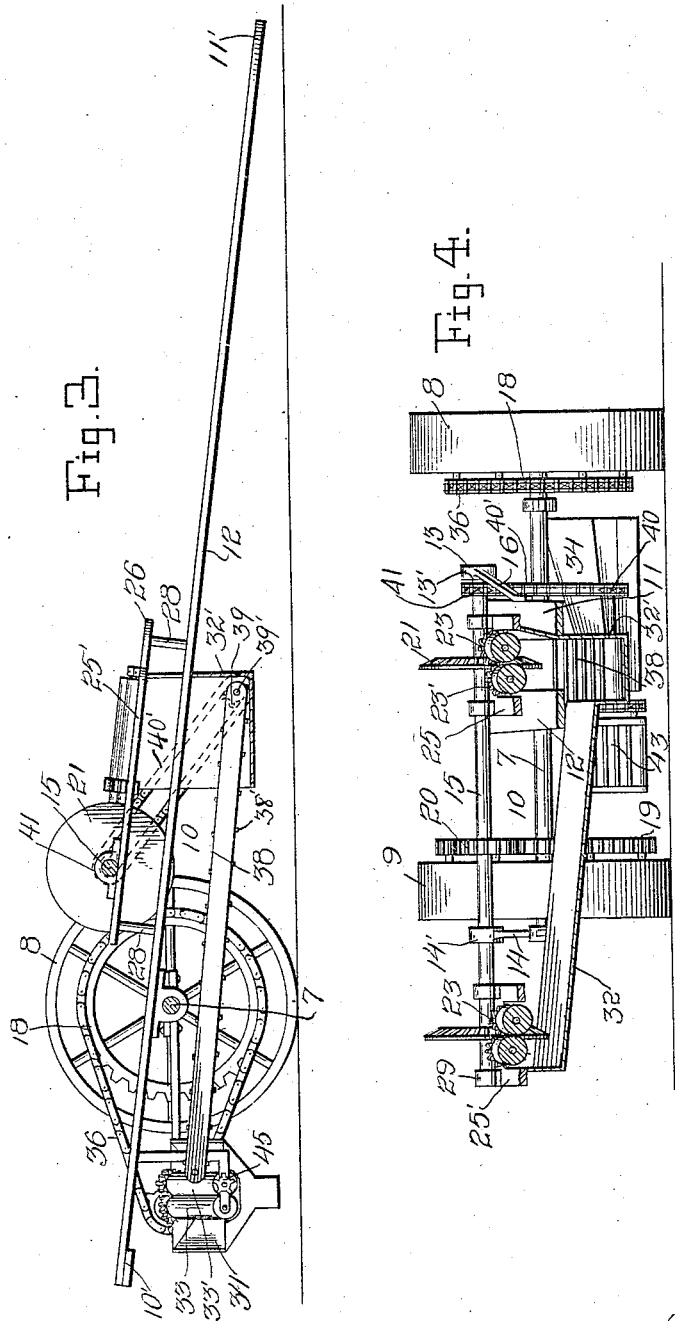

UNITED STATES PATENT OFFICE.

WALTER O. POWELL, OF HENDERSON, KENTUCKY, ASSIGNOR OF ONE-HALF TO E. A. ECKERT, OF HENDERSON, KENTUCKY.

CORN HARVESTING AND HUSKING MACHINE.

No. 880,467.  Specification of Letters Patent.  Patented Feb. 25, 1908.

Application filed October 30, 1906. Serial No. 341,261.

*To all whom it may concern:*

Be it known that I, WALTER O. POWELL, a citizen of United States, residing at Henderson, in the county of Henderson, State of Kentucky, have invented certain new and useful Improvements in Corn Harvesting and Husking Machines; and I do hereby declare the following to be a full, clear, and exact description of the invention, such as will enable others skilled in the art to which it appertains to make and use the same.

This invention has reference to corn harvesting and husking machines, and more particularly to devices of that class comprising a wheeled frame carrying snapping and shucking rolls, and endless belts for carrying the snapped ears from the snapping rolls to the shucking rolls, and from the latter to the wagon which usually follows directly behind the machine in the passage of the latter through the corn field.

The especial improvements reside in the provision of two oppositely disposed sets of snapping rolls so disposed as to discharge the ears onto a common elevator or belt whence they are conveyed to the shucking rolls. By this arrangement, it is possible for the machine to shuck two rows of corn at the same time, thus reducing by one half, the time heretofore consumed.

Further improvements consist in mounting the pairs of shucking rolls above referred to in U-shaped auxiliary frames connected with a transverse shaft disposed parallel with the axle of the machine and driven therefrom, the outer frame being pivotally connected with said shaft through its journal boxes, and carrying a pair of wheels, whereby it may accommodate itself to the surface of the ground and operate freely without regard to any unevenness or irregularity of the latter.

The invention further consists in the construction, combination, and arrangement of parts all as fully described, specifically claimed, and illustrated in the accompanying drawings, in which like parts are designated by corresponding reference numerals in the several views.

Figure 2:
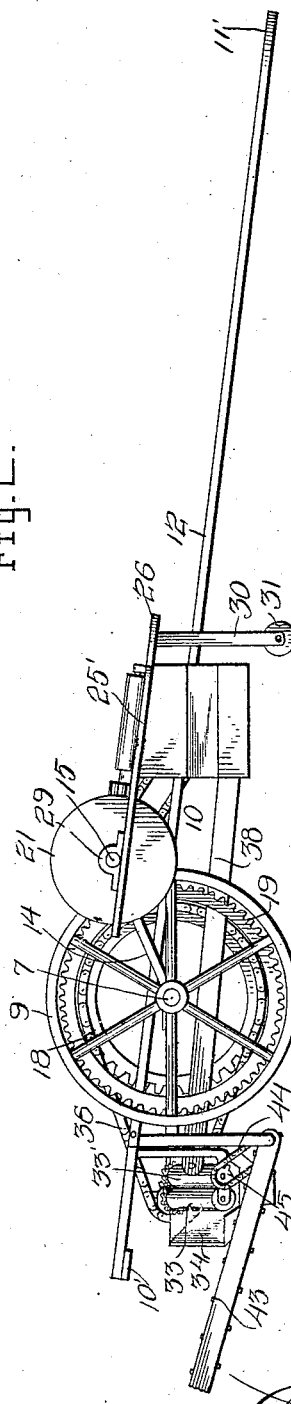

Of the said drawings—Figure 1 is a top plan of the improved machine. Fig. 2 is a side elevation thereof. Fig. 3 is a longitudinal vertical section taken on the line 3—3 of Fig. 1. Fig. 4 is a transverse vertical section taken on the line 4—4 of Fig. 1.

Referring now more particularly to the drawings, 7 designates the axle of the machine carrying the traction wheels 8 and 9 at its ends, said axle passing through bearings provided upon the main frame of the machine generally designated 10. Frame 10 comprises a pair of spaced beams 11 and 12, connected towards their rear ends by a cross beam 10′ and having their front ends bent outwardly in opposite directions as indicated by the numeral 11′, the space between said beams being sufficiently wide to allow the latter to pass on opposite sides of a row of corn when the machine is in operation.

Disposed parallel with the axle and slightly in advance thereof is a shaft 15, one end of which fits in a bearing 13′ formed in a collar 13 braced by a pair of rods 16 secured to the beam 11, the opposite end of said shaft extending through a collar 14′ formed on the upper end of a bracket 14, which is fastened at its lower end to the axle, the last-mentioned collar being connected with the beam 12 by a diagonal brace 17.

Disposed upon the axle 7 adjacent the traction wheel 9 is a gear 19, which meshes with a gear 20 carried by the shaft 15, which shaft is provided towards its opposite ends with a pair of pinions 21, each of which meshes with a pinion 22 which is compounded with a gear 23 mounted upon the shaft of a snapping roll 24, the shaft of the opposite snapping roll 24′ carrying a gear 23′ which meshes with and is driven by the gear 23, above referred to.

The snapping rolls are journaled in cutaway portions of the spaced arms of the U-shaped auxiliary frames 25 and 25′, the free ends of which are directed outwardly in opposite directions, as indicated by the reference numeral 26. The outer member of each pair of rolls is located slightly above the inner member, whereby said rolls will discharge the ears of corn snapped off the stalks during their passage therethrough onto a chute whence they fall onto the conveyer belt or elevator hereinafter described.

The frame 25 is rigidly supported slightly above the main frame by brackets 28, the left-hand pinion 21 (with respect to Fig. 1) fitting in the space between the arms of said frame, which space lies directly above the space between the beams of the main frame. Frame 25′ on the other hand carries on its upper face a pair of bearings 29 through which the corresponding end of the shaft 15 loosely passes, the gear 21 carried on said end being located between said bearings, and extending into the space between the arms of said frame. Frame 25' is further provided on its under face at the forward end thereof with a pair of depending brackets 30 in which the wheels 31 are mounted, said wheels serving as the supporting means for said frame. Owing to this construction the frame 25' will be capable of accommodating itself to any unevenness or irregularity of the ground over which the machine passes, as the loose passage of the shaft 15 through the bearings 29 will permit an independent pivotal movement of said frame thereon. The frame 25' is further provided with an inwardly-directed inclined chute 32 whose upper end is disposed directly beneath the snapping rolls.

Located towards the rear end of the main frame is a pair of husking rolls 33 and 33' mounted in any preferred manner, and inclosed by a hopper 34, the roll 33, which is slightly greater in length than the roll 33', having a sprocket wheel 35 on its extended end connected by a chain 36 with a sprocket 18 mounted on the axle 7 adjacent the traction wheel 8, whereby said roll is constantly rotated, such movement being communicated to roll 33' through intermeshing gears 37 and 37' provided on the respective rolls.

The snapped ears are conveyed from the snapping rolls to the husking rolls by an endless belt or elevator 38 whose chains 38' pass over a pair of sprockets 39 on a shaft 39' mounted in the depending casing 32' adjacent the frame 25 and carrying a third sprocket 40 connected by a chain 40' with a sprocket 41 on the shaft 15.

From the husking rolls, the ears pass onto a second elevator 43, the rear end of which is disposed adjacent thereto, said elevator being upwardly inclined and adapted to project over the end of the usual wagon (not shown) which follows the machine. Elevator 43 is driven by means of a sprocket chain 44 which passes over a sprocket provided upon the extended end of its lower shaft and over a sprocket 45 provided upon the extended end of the roll 33'.

It will be at once apparent that the depending casing 32' which is connected with the frame 25 and is inclined slightly inwards, as shown in Fig. 4 acts to some extent as a chute in like manner with the chute 32, and may be regarded as oppositely disposed with respect thereto, so that the term "oppositely disposed inclined chute" used in the appended claims may be correctly applied to such parts.

In the operation of the machine, the cornstalks pass between the snapping rolls provided on the frames 25 and 25', being directed thereinto by the inwardly directed ends 26 of said frames; the ears of corn are snapped off the stalks by the action of said rolls, and fall into the chutes 32 and 32' whence they reach the elevator 38 and are conveyed thereby to the husking rolls, by means of which latter the shuck is removed from the ears which are finally fed into the wagon by the elevator 43 after being husked.

It will be obvious from the foregoing that the shaft 15 may also be extended upon the opposite side of the machine, and a second independently movable frame carried upon such end whereby the machine may be made to operate upon three rows of corn at once instead of upon two.

Further modifications and changes may be made in the construction and arrangement of the various parts of the machine within the scope of the claims, as it is not intended that the invention be limited to the exact details of construction shown and described.

What is claimed is—

1. In a corn harvesting and husking machine, a main frame including an axle, and traction wheels carried by the latter; a shaft carried by said frame in advance of said axle and extending beyond said frame at one side thereof; an auxiliary frame mounted upon said main frame and connected with said shaft; an auxiliary frame at the extended end of said shaft; means secured to the under face of said pivoted frame for supporting the same; a pair of snapping rolls mounted in each of said auxiliary frames; a pair of husking rolls mounted on the rear end of the main frame; means for driving the several rolls; a single conveyer for feeding the ears of corn discharged from said snapping rolls onto said husking rolls; and means for discharging the ears of corn after being husked by said last-mentioned rolls.

2. In a corn harvesting and husking machine, a main frame, including an axle and traction wheels carried by the latter; a shaft carried by said frame in advance of said axle and extending beyond said frame at one side thereof; an auxiliary frame mounted upon said main frame and connected with said shaft; an auxiliary frame at the extended end of said shaft; a pair of wheels secured to the under face of said pivoted frame for supporting the same; a pair of snapping rolls, mounted in each of said auxiliary frames; a pair of husking rolls mounted on the rear end of the main frame; means for driving the several rolls; a single conveyer for feeding the ears of corn discharged from said snapping rolls onto said husking rolls; and means for discharging the ears of corn after being husked by said last-mentioned rolls.

3. In a corn harvesting and husking machine, a main frame including spaced longitudinal beams, an axle connecting said beams, and traction wheels carried by said axle; a shaft carried by said frame in advance of said axle and extending beyond said frame at one side thereof; a U-shaped auxiliary frame mounted upon said main frame and connected with said shaft, the members of said auxiliary frame being disposed directly above the spaced beams of the main frame; a U-shaped auxiliary frame at the extended end of said shaft; means secured to the under face of said pivoted frame for supporting the same; a pair of snapping rolls mounted in each of said auxiliary frames; a pair of husking rolls mounted on the rear end of the main frame; means for driving the several rolls; a single conveyer for feeding the ears of corn discharged from said snapping rolls onto said husking rolls; and means for discharging the ears after being husked by said last-mentioned rolls.

In testimony whereof, I affix my signature, in presence of two witnesses.

WALTER O. POWELL.

Witnesses:
 WM. H. STITES,
 CARL P. GEIBEL.